US012748658B2

(12) United States Patent
Confalonieri et al.

(10) Patent No.: US 12,748,658 B2
(45) Date of Patent: Sep. 29, 2026

(54) ERROR MANAGEMENT OF MEMORY DEVICES

(71) Applicant: Micron Technology, Inc., Boise, ID (US)

(72) Inventors: Emanuele Confalonieri, Segrate (IT); Marco Sforzin, Cernusco sul Naviglio (IT); Daniele Balluchi, Cernusco sul Navigli (IT); Danilo Caraccio, Milan (IT); Ravi Kiran Gummaluri, Freemont, CA (US); Stephen Scott Pawlowski, Beaverton, OR (US)

(73) Assignee: Micron Technology, Inc., Boise, ID (US)

( * ) Notice: Subject to any disclaimer, the term of this patent is extended or adjusted under 35 U.S.C. 154(b) by 60 days.

(21) Appl. No.: 19/023,687

(22) Filed: Jan. 16, 2025

(65) Prior Publication Data

US 2025/0245098 A1 Jul. 31, 2025

Related U.S. Application Data

(60) Provisional application No. 63/624,951, filed on Jan. 25, 2024.

(51) Int. Cl.
*G06F 11/10* (2006.01)

(52) U.S. Cl.
CPC ...... *G06F 11/1016* (2013.01); *G06F 11/1048* (2013.01); *G06F 11/1068* (2013.01)

(58) Field of Classification Search
CPC ............. G06F 11/1016; G06F 11/1048; G06F 11/1068; G06F 11/1008; G06F 3/0604; G06F 3/0658
See application file for complete search history.

(56) References Cited

U.S. PATENT DOCUMENTS

| | | | | |
|---|---|---|---|---|
| 5,956,473 A * | 9/1999 | Ma | G06F 11/1068 714/E11.038 |
| 8,996,957 B1 * | 3/2015 | Northcott | H03M 13/2906 714/763 |
| 2021/0349825 A1 * | 11/2021 | Kim | G06F 11/1068 |
| 2022/0113870 A1 * | 4/2022 | Cho | G06F 12/0246 |

OTHER PUBLICATIONS

Y. Wang, L. A. D. Bathen, Z. Shao and N. D. Dutt, "3D-FlashMap: A physical-location-aware block mapping strategy for 3D NAND flash memory," 2012 Design, Automation & Test in Europe Conference & Exhibition (Date), Dresden, Germany, 2012.*

Gurumurthi, et al., "An Overview of Reliability, Availability, and Serviceability (RAS) in Compute Express Link™ 2.0", Compute Express Link, Jan. 30, 2021, 18 pages.

* cited by examiner

*Primary Examiner* — Steve N Nguyen
(74) *Attorney, Agent, or Firm* — Lowenstein Sandler LLP

(57) ABSTRACT

A media management operation is initiated on a plurality of management units of one or more memory devices managed by the controller. A first error status and second error status associated with a read stage of the media management operation performed on a first management unit of the plurality of management units is received. An error correction operation on the first management unit is performed responsive to determining that the first error status and the second error status indicate a correctable error in the first management unit. An entry mapping a logical address to a physical address associated with the first management unit is locked responsive to determining that no spare management unit is available.

20 Claims, 8 Drawing Sheets

300

| | 0E | 1E | 2E | 3E |
|---|---|---|---|---|
| NE | CORRECT | CORRECTABLE | CORRECTABLE | UNCORRECTABLE |
| CE | CORRECTABLE | CORRECTABLE | CORRECTABLE | CORRECTABLE |
| UE | UNCORRECTABLE | UNCORRECTABLE | UNCORRECTABLE | UNCORRECTABLE |

FIG. 3

ERROR MANAGEMENT OF MEMORY DEVICES

RELATED APPLICATIONS

This application claims the benefit of U.S. Provisional Paten Application No. 63/624,951, filed Jan. 25, 2024, which is incorporated by reference herein.

TECHNICAL FIELD

Embodiments of the disclosure relate generally to memory sub-systems, and more specifically, relate to error management of CXL devices.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 3 is an illustrative error condition table used by the error management unit to modify the L2P data structure in accordance with some embodiments of the present disclosure.

DETAILED DESCRIPTION

Figure 1:
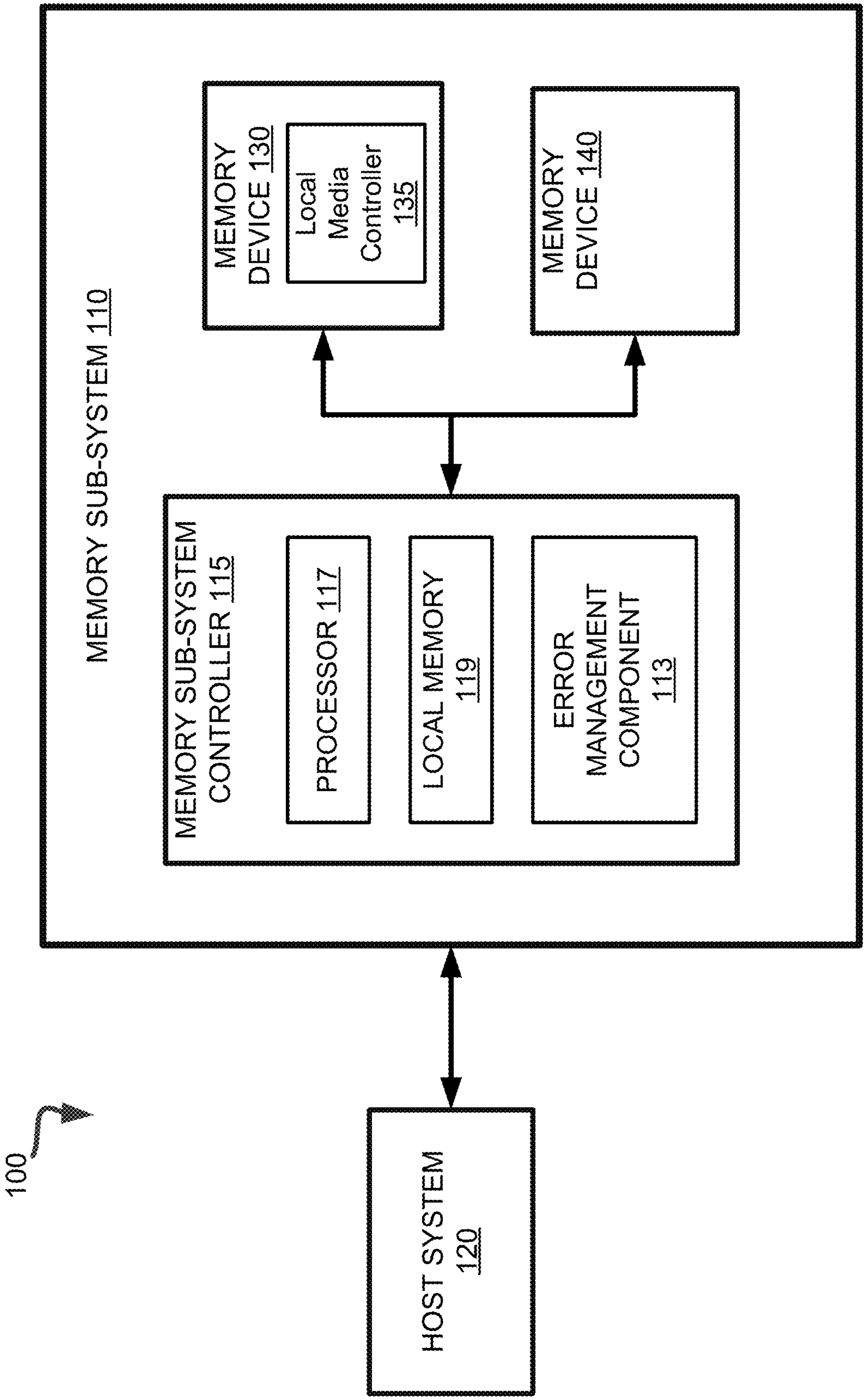
FIG. 1 illustrates an example computing system that includes a memory sub-system in accordance with some embodiments of the present disclosure.

Aspects of the present disclosure are directed to the error management of a CXL device. A memory sub-system can be a storage device, a memory module, or a combination of a storage device and memory module. Examples of storage devices and memory modules are described below in conjunction with FIG. 1. In general, a host system can utilize a memory sub-system that includes one or more memory components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a not-and (NAND) memory device. Other examples of non-volatile memory devices are described below in conjunction with FIG. 1. A non-volatile memory device is a package of one or more dies. Each die can includes of one or more planes. For some types of non-volatile memory devices (e.g., NAND devices), each plane includes of a set of physical blocks. Each block includes of a set of pages. Each page includes of a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

A memory device can include multiple memory cells arranged in a two-dimensional or a three-dimensional grid. Memory cells can be formed onto a silicon wafer in an array of columns connected by conductive lines (also hereinafter referred to as bitlines, or BLs) and rows connected by conductive lines (also hereinafter referred to as wordlines or WLs). A wordline can have a row of associated memory cells in a memory device that are used with one or more bitlines to generate the address of each of the memory cells. The intersection of a bitline and wordline constitutes the address of the memory cell. A block hereinafter refers to a unit of the memory device used to store data and can include a group of memory cells, a wordline group, a wordline, or individual memory cells. One or more blocks can be grouped together to form separate partitions (e.g., planes) of the memory device in order to allow concurrent operations to take place on each plane. The memory device can include circuitry that performs concurrent memory page accesses of two or more memory planes. For example, the memory device can include multiple access line driver circuits and power circuits that can be shared by the planes of the memory device to facilitate concurrent access of pages of two or more memory planes, including different page types. For ease of description, these circuits can be generally referred to as independent plane driver circuits. Depending on the storage architecture employed, data can be stored across the memory planes (i.e., in stripes). Accordingly, one request to read a segment of data (e.g., corresponding to one or more data addresses), can result in read operations performed on two or more of the memory planes of the memory device.

Some memory devices, such as non-volatile memory devices, can have limited endurance. For example, some memory devices can be written, read, or erased a finite number of times before the memory devices begin to physically degrade or wear and eventually fail.

A local controller of a memory component (or memory device) can perform media management operations to mitigate the effect of physical wear on the memory devices and lengthen the overall lifetime of the memory sub-system. For example, the local controller can perform a wear leveling operation to distribute the physical wear across management units of a memory device. A management unit refers to a particular amount of memory, such as a page or a block, of a memory device. To perform a wear leveling operation, the local controller can identify a management unit at a memory device that is subject to a significant amount of physical wear and can move data stored at the management unit to another management unit subject to a smaller amount of physical wear. In some instances, a management unit can be subject to a significant amount of physical wear if a large number of memory access operations, such as write operations (i.e., program operations) or read operations, are performed at the management unit. As such, in some implementations, the local controller can identify management units that are subject to large amounts of physical wear based, for example, on write counts for each management unit. A write count refers to a number of times that the local controller performs a write operation at a particular management unit over the lifetime of the management unit. The data from a management unit having a high write count can be swapped with the data of a management unit having low write count in an attempt to evenly distribute the wear across the management units of the memory component.

In some implementations, a local controller can start-gap wear leveling, which uses a mapping between logical addresses and physical addresses. The controller may then perform wear leveling operations by periodically moving each management unit to its neighboring location, regardless of the write traffic to the management unit. Start-gap wear leveling operations employ two registers: a start register and a gap register, and an extra memory management unit to facilitate data movement. The controller can utilize the gap register to keep track of the number of management units that have been moved. When all the management units in a pool of management units designated for wear leveling operations have been moved, the controller can increment the start register, thus keeping track of the number of times all management units have been moved. The mapping of management units from logical address to physical address is done by operations of gap and start registers with the logical address, as explained below.

Specifically, a memory system designates multiple management units in a pool of management units for wear leveling operations, and each management unit corresponds to a physical address (e.g., 16 management units corresponding to physical address 0-15). To implement the start-gap wear leveling, an extra management unit is added at a location adjacent to the multiple management units (e.g., a location corresponding to physical address 16). The total management units including the extra management unit (e.g., 16 management units plus one extra management unit) can form a circular pool. The extra management unit is a memory location that contains no useful data. The start register and the gap register are initialized such that the start register would initially point to a location corresponding to a physical address (e.g., physical address 0), and the gap register, which always points to the location of the extra management unit, would initially point to a location corresponding to a physical address (e.g., physical address 16). Upon performing a predefined number of memory write operations, the content of location referenced by the gap register decremented by one (e.g., a location corresponding to physical address 15) is copied to the location of the extra management unit (e.g., a location corresponding to physical address 16). That is, the content is moved to a neighboring location. The values stored by the gap register are then decremented, such that it would reference a neighboring location, which, after moving the content, would be the location identified by a physical address that immediately precedes the physical address in the address range (e.g., physical address 15). After the number of movements of the gap register reaches to the number of management units in the pool of management units for wear leveling operations (e.g., 16 movements), the gap register is wrapped around the address range (e.g., pointing to physical address 0). For the next data movement, the gap register is reset to the initial address of the range (e.g., pointing to physical address 16), and because the contents of all (e.g., 16) management units in the pool have been moved once, the start register is incremented by one. As such, every movement of the gap register provides a remapping of the content (specific to a logical address) to its neighboring location (corresponding to a physical address).

During the wear leveling operations, some management units may experience a read error. In particular, the data from the original location could not be read successfully, preventing its relocation to a new location due to a read disturbance, failure in reading the original data accurately, or a memory cell that cannot be reliably read. Because of the constant movement and remapping of the position of the error, the memory sub-system controller may be unable to consistently and accurately obtain information corresponding to the location of the error from the local controller.

Aspects of the present disclosure address the above and other deficiencies by managing logical-to-physical (L2P) data structure based on errors associated with a media management operation (e.g., a wear leveling operation) using a pool of management units. The media management operation performs a read operation on a management unit of the pool of management units, using a logical address mapped to a physical address of the management unit, neighboring the gap management unit of the pool of management units (e.g., the next management unit after the gap management unit). One or more errors may be identified in response to the read operation performed on the management unit. For example, an error status may be received from the controller of the memory sub-system and another error status may be received from the memory devices of the memory sub-system containing the pool of management units. Based on the one or more error status, the read operation may result in no error, correctable error, or uncorrectable error at the physical address associated with the logical address. In particular, based on an error condition table, indicating which combinations of errors results may result in no error, correctable error, or uncorrectable error.

If the read operation resulted in no error, the read data is written to the gap management unit and an entry of the L2P data structure may be updated to reflect a mapping of the logical address to a physical address associated with the gap management unit. If the read operation resulted in a correctable error, error correction operations may be performed on management unit to correct the error. Based on a successful error correction, the read data is written to the gap management unit and the L2P data structure may be updated to reflect a mapping of the logical address to a physical address associated with the gap management unit. If the error correction is unsuccessful and a spare management unit (e.g., a management unit of another pool of management units) is available, the read data is written to the spare management unit and an entry of the L2P data structure may be updated to reflect a mapping of the logical address to a physical address associated with the spare management unit. If the error correction is unsuccessful and no spare management units are available, an entry mapping the logical address to a physical address associated with the management unit is maintained, also referred to as a locked entry (e.g., locked) e.g., locked in the L2P data structure. Similarly, if the read operation resulted in an uncorrectable error, an entry mapping the logical address to a physical address associated with the management unit is maintained (e.g., locked) in the L2P data structure.

Advantages of the present disclosure include, but are not limited to, a removal of uncorrectable and/or unrepairable management units from the pool of management units by maintaining (e.g., locking) the mapping of the logical address to the uncorrectable and/or unrepairable management units, thereby providing a user information regarding the location of the uncorrectable and/or unrepairable management units.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a not-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks. Some types of memory, such as 3D cross-point, can group pages across dice and channels to form management units (MUs).

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), not-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical MU address, physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local media controller 135) on the die and a controller (e.g., memory sub-system controller 115) for media management within the same memory device package. An example of a managed memory device is a managed NAND (MNAND) device.

The memory sub-system 110 includes an error management component 113 that can remove uncorrectable and/or unrepairable management units from the pool of management units used by the wear leveling operations by maintaining (e.g., locking) the mapping of logical addresses to the uncorrectable and/or unrepairable management units, thereby providing information regarding the location of the uncorrectable and/or unrepairable management units. In some embodiments, the memory sub-system controller 115 includes at least a portion of the error management component 113. In some embodiments, the error management component 113 is part of the host system 120, an application, or an operating system. In other embodiments, local media controller 135 includes at least a portion of error management component 113 and is configured to perform the functionality described herein.

The error management component 113 receives a request to perform a memory management operation, such as a wear leveling operation on memory device(s) 130 and/or 140 that are interconnected and operate in synchronization, executing the same instructions and storing/retrieving data simultaneously (e.g., locked redundant array of independent disk (LRAID)). This redundancy enables error detection and correction, ensuring that the data stored and retrieved by each memory device matches. If a mismatch or error is detected between the redundant memory devices, it indicates a potential memory error, and appropriate measures can be taken to address it.

The error management component 113 includes a wear leveling pool. The wear leveling pool, also referred to as a circular pool, includes a plurality of management units. For example, each virtual bank has a wear leveling pool. A virtual bank is a set of homologous banks in locked dice, i.e., dice accessed in parallel through the same channel. At the beginning, all the physical locations in a virtual bank belong to the wear leveling pool. During the life, some location could be impacted by a failure. When the failure is recognized, the correspondent impacted locations will determine an hole and they will be removed from the WL pool. A management unit of the wear leveling pool is used as an extra management unit, also referred to as a gap management unit that contains no useful data. Each management unit corresponds to a physical address. A logical-to-physical (L2P) data structure is used to maintain a mapping between logical addresses and physical addresses of the wear leveling pool.

The error management component 113 initiates the wear leveling operation. For each step of the wear leveling operation, the error management component 113 performs a read operation on a management unit. The read operation is performed on a management unit neighboring the gap management unit (e.g., the next management unit after the gap management unit).

The error management component 113 may receive, based on a result of the read operation of the wear leveling operations, one or more error correction codes (ECCs). The error management component 113 may receive, from all the memory devices of the LRAID, a DECTED ECC. For example, each memory device may use a Double Error Correcting, Triple Error Detecting (DEC-TED) scheme which refers to the ability of the error correction code to correct up to two errors within a data word and to detect up to three errors with the data word. Accordingly, if the DEC-TED ECC of all memory devices detect no error in performing the read operation, the DECTED ECC is "0E," if at least one DEC-TED ECC of all memory devices detects and corrects an error the DECTED ECC is "1E," if at least one DEC-TED ECC of all memory devices detects and corrects two errors the DECTED ECC is "2E," and if at least one DEC-TED ECC of all memory devices detects three errors the DECTED ECC is "3E." In some embodiments, the ECC mechanism may execute a Single Error Correction (SEC) scheme which refers to the ability of the error correction code to detect and correct a single-bit error within a data word.

The error management component 113 may further receive, from the memory sub-system controller 115, an LRAID ECC. For example, if no error is detected at the LRAID the LRAID ECC is "NE," if at least one error is detected and corrected at the LRAID the LRAID ECC is "CE," and if at least two errors are detected at the LRAID the LRAID ECC is "UE."

The error management component 113, based on the DEC-TED ECC and the LRAID ECC, may determine an error condition of the read data. For example, the error condition may be "correct" indicating that the data is correct and includes no errors, "correctable" indicating that the data include error(s) that are correctable, and "uncorrectable" indicating that the data include error(s) that are uncorrectable. In particular, the error management component 113 may manage an error status table, indicating which combinations of DEC-TED ECC and LRAID ECC may result in no error, correctable error, or uncorrectable error. The error status table may be defined through a logical circuit.

The error management component 113 may determine that the error condition is "correct" if the DEC-TED ECC is either "0E" or "1E" and the LRAID ECC is "NE." Accordingly, the error management component 113 performs a write operation to write the data read during the read operation to the gap management unit using a physical address of the gap management unit stored in a gap register of the error management component 113. The error management component 113 updates an entry of the L2P data structure mapping the logical address to the physical address of the management unit to map the logical address to the physical address of the gap management unit. The error management component 113 updates the gap register to point to the physical address of the management unit which becomes the new gap management unit. If the error condition is "correct" due to a DEC-TED ECC of "1E," the error management component 113 may log, to an error log of the error management component 113, the DEC-TED ECC and LRAID ECC.

The error management component 113 may determine that the error condition is "correctable" if the DEC-TED ECC is "2E" and the LRAID ECC is "NE" or if the LRAID ECC is "CE" no matter what the DEC-TED ECC is. The error management component 113 may perform an error correction operation (e.g., a memory scrubbing operation) to correct the errors in the data and perform a memory access operation (e.g., a read operation) to access the corrected data. Memory scrubbing operation corrects an error in the data and writes the corrected data back.

In some embodiments, the error correction operation may be successful, and the error management component 113 may not receive an ECC (e.g., DEC-TED ECC or LRAID ECC). Accordingly, the error management component 113 performs a write operation to write the corrected data to the gap management unit using a physical address of the gap management unit stored in a gap register of the error management component 113. The error management component 113 updates an entry of the L2P data structure mapping the logical address to the physical address of the management unit to map the logical address to the physical address of the gap management unit. The error management component 113 updates the gap register to point to the physical address of the management unit which becomes the new gap management unit. The error management component 113 may log, to an error log of the error management component 113, the DEC-TED ECC and LRAID ECC.

In some embodiments, the error management component 113 may receive, based on results of the read operation after the error correction operation, at least one ECC (e.g., DEC-TED ECC and/or LRAID ECC).

The error management component 113 may include a spare wear leveling pool, distinct from the wear leveling pool. The spare wear leveling pool may include a plurality of management units that are unique from the plurality of management units of the wear leveling pool. The error management component 113 may identify a management unit of the spare wear leveling pool that is available. The error management component 113 performs a write operation to write the corrected data to the gap management unit using a physical address of the gap management unit stored in a gap register of the error management component 113. The error management component 113 updates an entry of the L2P data structure mapping the logical address to the physical address of the management unit to map the logical address to the physical address of the gap management unit. The error management component 113 updates the gap register to point to the identified management unit of the spare wear leveling pool which becomes the new gap management unit. The error management component 113 may log, to an error log of the error management component 113, the DEC-TED ECC and LRAID ECC.

In some embodiments, the error management component 113 may not include a spare wear leveling pool or may not identify any available management unit of the spare wear leveling pool. Thus, the error management component 113 does not update (e.g., maintains) the entry of the L2P data structure mapping the logical address to the physical address of the management unit. In other words, the error management component 113 generates a hole in the L2P data structure by locking the entry of the L2P data structure mapping the logical address to the physical address of the management unit. The error management component 113 does not update (e.g., maintains) the physical address in the gap register. The error management component 113 may log to an error log of the error management component 113, the DEC-TED ECC and LRAID ECC. In some embodiments, the error management component 113 may generate an event record logging information associated with the LRAID ECC including a physical address of the management unit to be logged in an event log of the memory sub-system 110.

The error management component 113 may determine that the error condition is "uncorrectable" if the DEC-TED ECC "3E" and the LRAID ECC is "NE" or if the LRAID ECC is "UE" no matter what the DEC-TED ECC is. Accordingly, the error management component 113 does not update (e.g., maintains) the entry of the L2P data structure mapping the logical address to the physical address of the management unit. In other words, the error management component 113 generates a hole in the L2P data structure by locking the entry of the L2P data structure mapping the logical address to the physical address of the management unit. The error management component 113 does not update (e.g., maintains) the physical address in the gap register. The error management component 113 may log to an error log of the error management component 113, the DEC-TED ECC and LRAID ECC. In some embodiments, the error management component 113 may generate an event record logging information associated with the LRAID ECC including a physical address of the management unit to be logged in an event log of the memory sub-system 110. In some embodiments, the memory sub-system may include a list that facilitates the discovery of faults in persistent memory (e.g., memory devices of the LRAID). In some embodiments, the error management component 113 may update the list with the physical address of the management unit.

Depending on the embodiment, the error management component 113 may receive a request to perform a memory access operation (e.g., a read operation). The error management component 113 may receive, based on results of the read operation, one or more error correction codes (ECCs).

The error management component 113 may determine that the error condition is "correct" if the DEC-TED ECC is either "0E" or "1E" and the LRAID ECC is "NE." Accordingly, the error management component 113 performs a write operation to write the data read during the read operation to a cache of the memory sub-system 110. The error management component 113 may transmit the data from the cache to the host system 120. If the error condition is "correct" and the DEC-TED ECC is "1E," the error management component 113 may log the DEC-TED ECC and LRAID ECC. The error management component 113 may further perform an error correction operation (e.g., a memory scrubbing operation) to correct the errors in the data.

The error management component 113 may determine that the error condition is "correctable" if the DEC-TED ECC is "2E" and the LRAID ECC is "NE" or if the LRAID ECC is "CE" no matter what the DEC-TED ECC is. The error management component 113 performs a write operation to write the data read during the read operation to a cache of the memory sub-system 110. The error management component 113 may transmit the data from the cache to the host system 120. The error management component 113 may perform an error correction operation (e.g., a memory scrubbing operation) to correct the errors in the data and perform a memory access operation (e.g., a read operation) to access the corrected data. Memory scrubbing operation corrects an error in the data and writes the corrected data back.

In some embodiments, the error management component 113 may receive, based on results of the read operation after the error correction operation, at least one ECC (e.g., DEC-TED ECC and/or LRAID ECC). The error management component 113 may include a spare wear leveling pool. The spare wear leveling pool may include a plurality of management units. The error management component 113 may identify a management unit of the spare wear leveling pool that is available. Thus, the error management component 113 performs a write operation to write the corrected data to the identified management unit of the spare wear leveling pool using a physical address of the identified management unit of the spare wear leveling pool.

In some embodiments, the error management component 113 may not include a spare wear leveling pool or may not identify any available management unit of the spare wear leveling pool. Thus, the error management component 113 does not update (e.g., maintains) the entry of the L2P data structure mapping the logical address to the physical address of the management unit. In other words, the error management component 113 generates a hole in the L2P data structure by locking the entry of the L2P data structure mapping the logical address to the physical address of the management unit. The error management component 113 does not update (e.g., maintains) the physical address in the gap register. The error management component 113 may log to an error log of the error management component 113, the DEC-TED ECC and LRAID ECC. In some embodiments, the error management component 113 may generate an event record logging information associated with the LRAID ECC including a physical address of the management unit to be logged in an event log of the memory sub-system 110.

The error management component 113 may determine that the error condition is "uncorrectable" if the DEC-TED ECC "3E" and the LRAID ECC is "NE" or if the LRAID ECC is "UE" no matter what the DEC-TED ECC is. The error management component 113 performs a write operation to write the data read during the read operation to a cache of the memory sub-system 110. The error management component 113 may transmit the data to the host system 120. The error management component 113 does not update (e.g., maintains) the entry of the L2P data structure mapping the logical address to the physical address of the management unit. In other words, the error management component 113 generates a hole in the L2P data structure by locking the entry of the L2P data structure mapping the logical address to the physical address of the management unit. The error management component 113 does not update (e.g., maintains) the physical address in the gap register. The error management component 113 may log to an error log of the error management component 113, the DEC-TED ECC and LRAID ECC. In some embodiments, the error management component 113 may generate an event record logging information associated with the LRAID ECC including a physical address of the management unit to be logged in an event log of the memory sub-system 110. In some embodiments, the memory sub-system may include a list that facilitates the discovery faults in persistent memory (e.g., memory devices of the LRAID). In some embodiments, the error management component 113 may update the list with the physical address of the management unit. Further details with regards to the operations of the error management component 113 are described below.

Figure 2A:
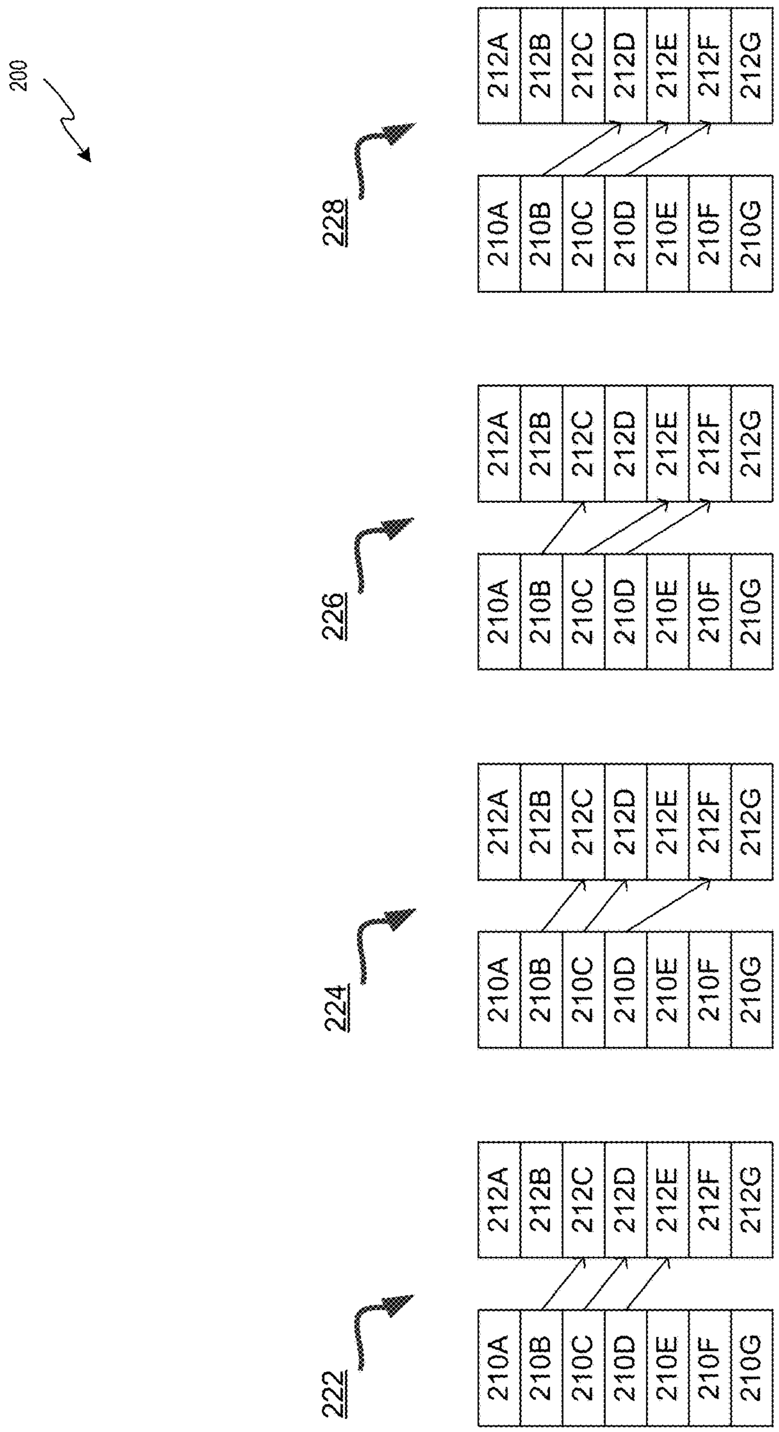
FIG. 2A is an illustrative example of the error management unit managing a logical-to-physical (L2P) data structure based on a wear leveling operation in accordance with some embodiments of the present disclosure.

FIG. 2A is an illustrative example of the error management unit of the CXL device (e.g., error management component 113 of FIG. 1) managing a L2P data structure based on wear leveling operation 200 in accordance with some embodiments of the present disclosure. During wear leveling operation 200, the error management component 113 may or may not modify the L2P data structure at various moments 222, 224, 226, and/or 228.

Initially, at moment 222 of the wear leveling operation 200, the L2P data structure shows that logical address 210B is mapped to physical address 212C corresponding to a management unit of a wear leveling pool, logical address 210C is mapped to physical address 212D corresponding to a management unit of the wear leveling pool, and logical address 210D is mapped to physical address 212E corresponding to a management unit of the wear leveling pool. The gap register of the error management component 113 may indicate that physical address 212F corresponding to a management unit of the wear leveling pool is the gap management unit of the wear leveling pool.

The error management component 113 may perform a read operation on the management unit associated with the logical address 210D (e.g., the management unit at physical address 212E) to read data of the management unit. The error management component 113 may receive no ECC codes as a result of the read operation. The error management component 113 may perform a write operation to write the data from the management unit (e.g., the management unit at physical address 212E) to the gap management unit (e.g., the management unit at physical address 212F).

Accordingly, at moment 224 of the wear leveling operation 200, the L2P data structure may indicate that the error management component 113 updated the L2P mapping so that logical address 210D points to physical address 212F and the gap register is updated with physical address 212E representing the new gap management unit. Thus, the L2P data structure shows that logical address 210B is mapped to physical address 212C, logical address 210C is mapped to physical address 212D, and logical address 210D is mapped to physical address 212F.

The error management component 113 may perform a read operation on the management unit associated with the logical address 210C (e.g., the management unit at physical address 212D) to read data of the management unit. The error management component 113 may receive no ECC codes as a result of the read operation. The error management component 113 may perform a write operation to write the data from the management unit (e.g., the management unit at physical address 212D) to the gap management unit (e.g., the management unit at physical address 212E).

Accordingly, at moment 226 of the wear leveling operation 200, the L2P data structure may indicate that the error management component 113 updated the L2P mapping so that logical address 210C points to physical address 212E and the gap register is updated with physical address 212D representing the new gap management unit. Thus, the L2P data structure shows that logical address 210B is mapped to physical address 212C, logical address 210C is mapped to physical address 212E, and logical address 210D is mapped to physical address 212F. The gap register of the error management component 113 may indicate physical address 212D is the gap management unit.

The error management component 113 may perform a read operation on the management unit associated with the logical address 210B (e.g., the management unit at physical address 212C) to read data of the management unit. The error management component 113 may receive no ECC codes as a result of the read operation. The error management component 113 may perform a write operation to write the data from the management unit (e.g., the management unit at physical address 212B) to the gap management unit (e.g., the management unit at physical address 212D).

Accordingly, at moment 228 of the wear leveling operation 200, the L2P data structure may indicate that the error management component 113 updated the L2P mapping so that logical address 210B points to physical address 212D and the gap register is updated with physical address 212C representing the new gap management unit. Thus, the L2P data structure shows that logical address 210B is mapped to physical address 212D, logical address 210C is mapped to physical address 212E, and logical address 210D is mapped to physical address 212F. The gap register of the error management component 113 may indicate physical address 212C is the gap management unit.

Figure 2B:
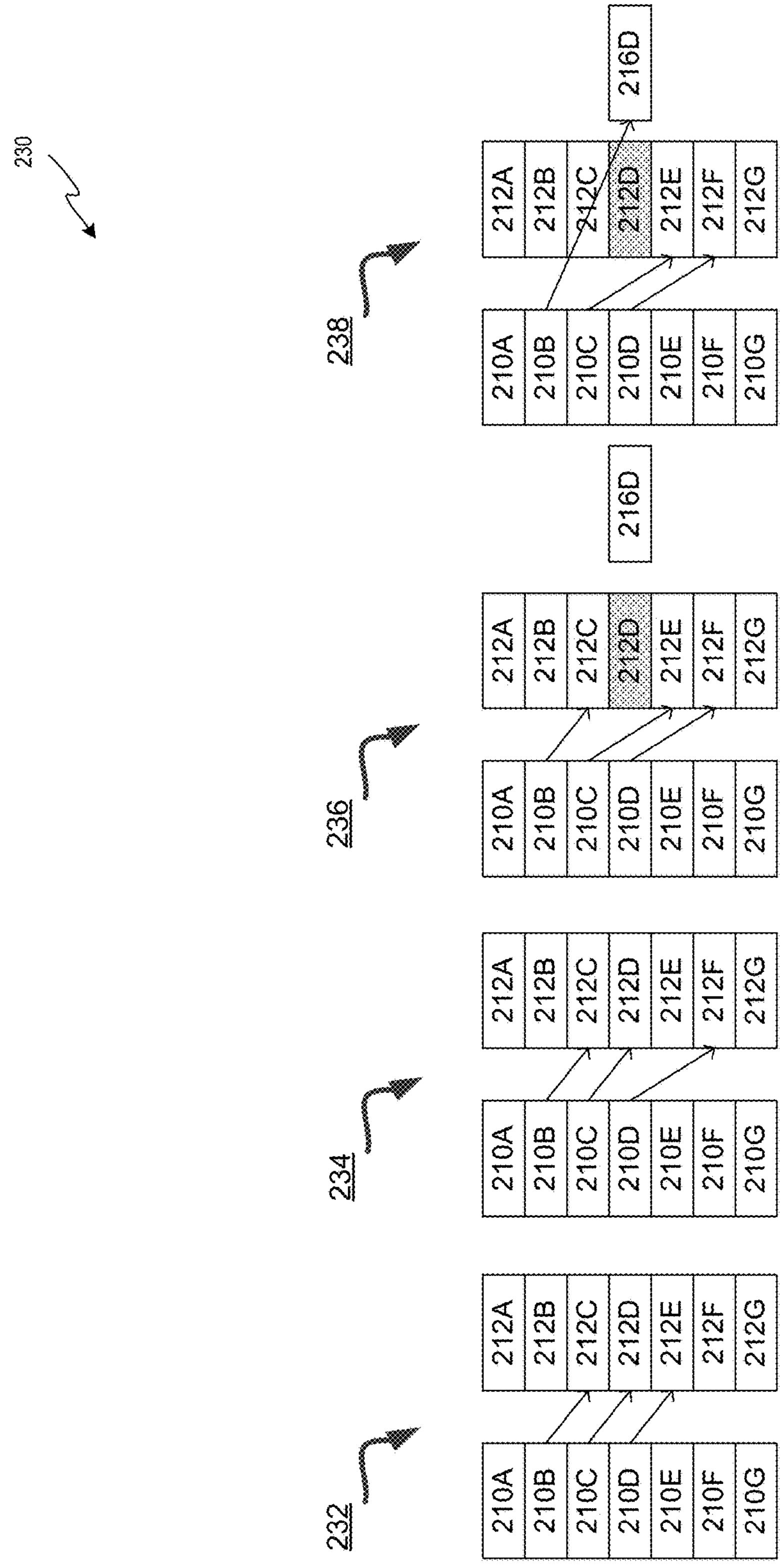
FIG. 2B is an illustrative example of the error management unit managing the L2P data structure based on a wear leveling operation in accordance with some embodiments of the present disclosure.

FIG. 2B is an illustrative example of the error management unit of the CXL device (e.g., error management component 113 of FIG. 1) managing a L2P data structure based on wear leveling operation 230, the error management component 113 may or may not modify an L2P data structure at various moments 232, 234, 236, and/or 238.

Initially, at moment 232 of the wear leveling operation 230, the L2P data structure shows that logical address 210B is mapped to physical address 212C corresponding to a management unit of a wear leveling pool, logical address 210C is mapped to physical address 212D corresponding to a management unit of the wear leveling pool, and logical address 210D is mapped to physical address 212E corresponding to a management unit of the wear leveling pool. The gap register of the error management component 113 may indicate that physical address 212F corresponding to a management unit of the wear leveling pool is the gap management unit of the wear leveling pool.

The error management component 113 may perform a read operation on the management unit associated with the logical address 210D (e.g., the management unit at physical address 212E) to read data of the management unit. The error management component 113 may receive no ECC codes as a result of the read operation. The error management component 113 may perform a write operation to write the data from the management unit (e.g., the management unit at physical address 212E) to the gap management unit (e.g., the management unit at physical address 212F).

Accordingly, at moment 234 of the wear leveling operation 230, the L2P data structure may indicate that the error management component 113 updated the L2P mapping so that logical address 210D points to physical address 212F and the gap register is updated with physical address 212E representing the new gap management unit. Thus, the L2P data structure shows that logical address 210B is mapped to physical address 212C, logical address 210C is mapped to physical address 212D, and logical address 210D is mapped to physical address 212F.

The error management component 113 may perform a read operation on the management unit associated with the logical address 210C (e.g., the management unit at physical address 212D) to read data of the management unit. The error management component 113 may receive one or more ECC codes as a result of the read operation. If the error condition as a result of one or more ECC codes is "correctable,", the error management component 113 may perform an error correction operation (e.g., a memory scrubbing operation) to correct the errors in the data (e.g., corrected data) and perform a memory access operation (e.g., a read operation) to access the corrected data.

The error management component 113 may continue to receive one or more ECC codes as a result of the read operation after the error correction operation. The error management component 113 may determine and identify a management unit of a spare wear leveling pool that is available (e.g., management unit at physical address 216D). The error management component 113 may perform a write operation to write the corrected data from the management unit (e.g., the management unit at physical address 212D) to the gap management unit (e.g., the management unit at physical address 212E).

Accordingly, at moment 236 of the wear leveling operation 230, the L2P data structure may indicate that the error management component 113 updated the L2P mapping so that logical address 210C points to physical address 212E and the gap register is updated with physical address 216D representing the new gap management unit. Thus, the L2P data structure shows that logical address 210B is mapped to physical address 212C, logical address 210C is mapped to physical address 212E, and logical address 210D is mapped to physical address 212F.

The error management component 113 may perform a read operation on the management unit associated with the logical address 210B (e.g., the management unit at physical address 212C) to read data of the management unit. The error management component 113 may receive no ECC codes as a result of the read operation. The error management component 113 may perform a write operation to write the data from the management unit (e.g., the management unit at physical address 212B) to the gap management unit (e.g., the management unit at physical address 216D).

Accordingly, at moment 238 of the wear leveling operation 230, the L2P data structure may indicate that the error management component 113 updated the L2P mapping so that logical address 210B points to physical address 216D and the gap register is updated with physical address 212C representing the new gap management unit. Thus, the L2P data structure shows that logical address 210B is mapped to physical address 216D, logical address 210C is mapped to physical address 212E, and logical address 210D is mapped to physical address 212F. The gap register of the error management component 113 may indicate physical address 212C is the gap management unit.

Figure 2C:
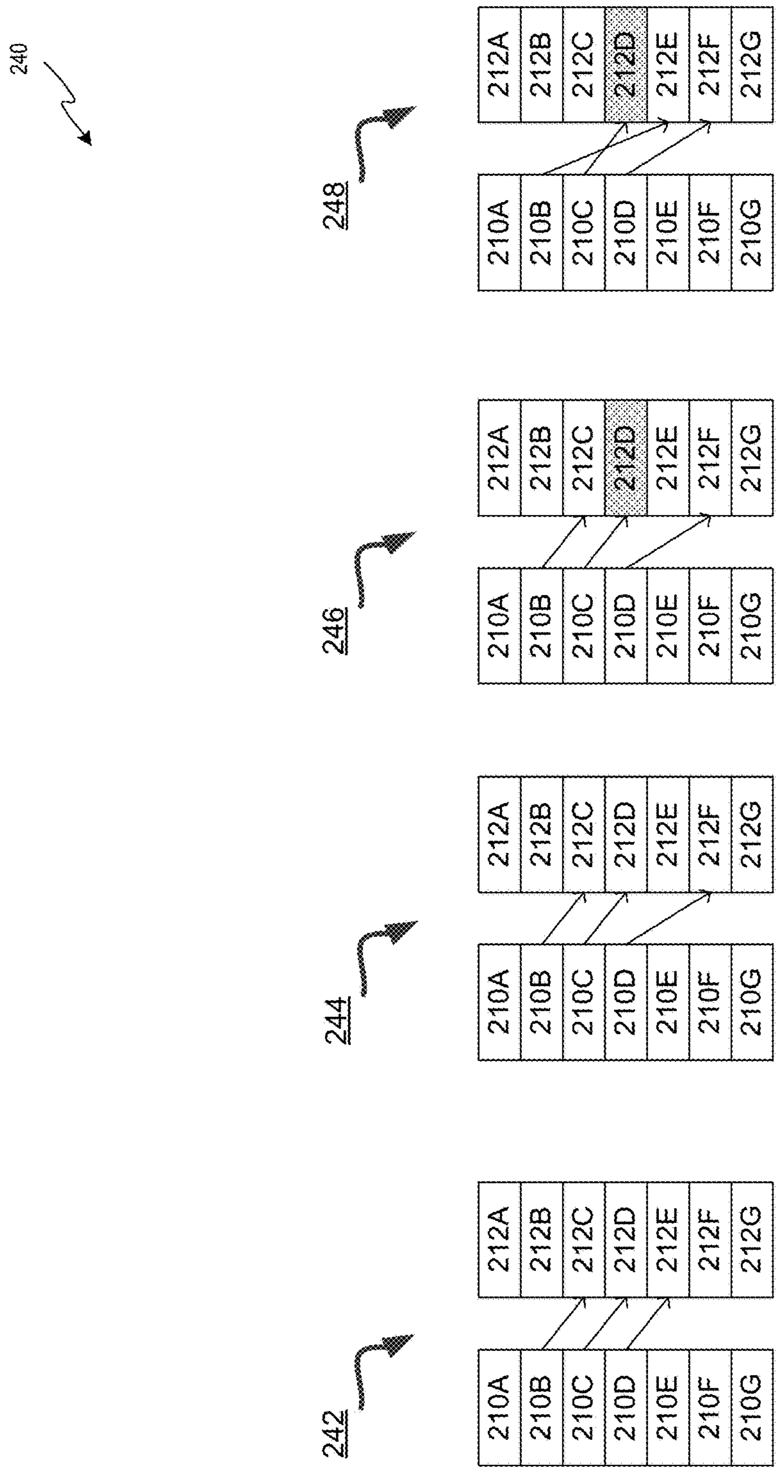
FIG. 2C is an illustrative example of the error management unit managing the L2P data structure based on a wear leveling operation in accordance with some embodiments of the present disclosure.

FIG. 2C is an illustrative example of the error management unit of the CXL device (e.g., error management component 113 of FIG. 1) managing a L2P data structure based on wear leveling operation 240, the error management component 113 may or may not modify an L2P data structure at various moments 242, 244, 246, and/or 248.

Initially, at moment 242 of the wear leveling operation 240, the L2P data structure may indicate that logical address 210B is mapped to physical address 212C corresponding to a management unit of a wear leveling pool, logical address 210C is mapped to physical address 212D corresponding to a management unit of the wear leveling pool, and logical address 210D is mapped to physical address 212E corresponding to a management unit of the wear leveling pool. The gap register of the error management component 113 may indicate physical address 212F is the gap management unit of the wear leveling pool.

The error management component 113 may perform a read operation on the management unit associated with the logical address 210D (e.g., the management unit at physical address 212E) to read data of the management unit. The error management component 113 may receive no ECC codes as a result of the read operation. The error management component 113 may perform a write operation to write the data from the management unit (e.g., the management unit at physical address 212E) to the gap management unit (e.g., the management unit at physical address 212F).

Accordingly, at moment 244 of the wear leveling operation 240, the L2P data structure may indicate that the error management component 113 updated the L2P mapping so that logical address 210D points to physical address 212F and the gap register is updated with physical address 212E representing the new gap management unit. Thus, the L2P data structure shows that logical address 210B is mapped to physical address 212C, logical address 210C is mapped to physical address 212D, and logical address 210D is mapped to physical address 212F.

The error management component 113 may perform a read operation on the management unit associated with the logical address 210C (e.g., the management unit at physical address 212D) to read data of the management unit. The error management component 113 may receive one or more ECC codes as a result of the read operation.

In an embodiment, if the error condition as a result of one or more ECC codes is "correctable," the error management component 113 may perform an error correction operation (e.g., a memory scrubbing operation) to correct the errors in the data (e.g., corrected data) and perform a memory access operation (e.g., a read operation) to access the corrected data. The error management component 113 may continue to receive one or more ECC codes as a result of the read operation after the error correction operation. The error management component 113 may not identify a management unit of the spare wear leveling pool that is available (e.g., management unit at physical address 216D of FIG. 2B). The error management component 113 may generate a hole in the L2P data structure by maintaining (e.g., locking) the mapping of logical address 210C to physical address 212D. In another embodiment, if the error condition as a result of one or more ECC codes is "uncorrectable," the error management component 113 may generate a hole in the L2P data structure by maintaining (e.g., locking) the mapping of logical address 210C to physical address 212D.

Accordingly, at moment 246 of the wear leveling operation 240, the L2P data structure may indicate that the error management component 113 maintained (e.g., did not update) the L2P mapping so the gap register is not updated. Thus, the L2P data structure shows that logical address 210B is mapped to physical address 212C, logical address 210C is stilled mapped to physical address 212D, and logical address 210D is mapped to physical address 212F.

The error management component 113 may perform a read operation on the management unit associated with the logical address 210B (e.g., the management unit at physical address 212C) to read data of the management unit. The error management component 113 may receive no ECC codes as a result of the read operation. The error management component 113 may perform a write operation to write the data from the management unit (e.g., the management unit at physical address 212B) to the gap management unit (e.g., the management unit at physical address 212E).

Accordingly, at moment 248 of the wear leveling operation 240, the L2P data structure may indicate that the error management component 113 updated the L2P mapping so that logical address 210B points to physical address 212E and the gap register is updated with physical address 212C representing the new gap management unit. Thus, the L2P data structure shows that logical address 210B is mapped to physical address 212E, logical address 210C is mapped to physical address 212D, and logical address 210D is mapped to physical address 212F. The gap register of the error management component 113 may indicate physical address 212C is the gap management unit.

FIG. 3 is an illustrative error condition table 300 used by the error management unit of the CXL device (e.g., error management component 113 of FIG. 1) to modify the L2P data structure in accordance with some embodiments of the present disclosure.

The error condition table 300 may be stored in the local memory 119 of the memory sub-system 110. The error condition table 300 includes multiple rows identified by an LRAID ECC (e.g., "NE," "CE," and "UE). LRAID ECC is received by the error management component. "NE" indicates that no error is detected at the LRAID. "CE" indicates that at least one error is detected and corrected at the LRAID. "UE" indicates that at least two errors are detected at the LRAID.

The error condition table 300 includes multiple columns identified by a DEC-TED ECC (e.g., "0E," "1E," "2E," and "3E"). DEC-TED ECC is received by the error management component. "0E" indicates that all memory devices of the LRAID detect no error the DECTED ECC. "1E" indicates that at least one DEC-TED ECC of all memory devices of the LRAID detected and corrected an error. "2E" indicates that at least one DEC-TED ECC of all memory devices of the LRAID detected and corrected two errors. "3E" indicates that at least one DEC-TED ECC of all memory devices of the LRAID detected three errors.

Each intersection between the DEC-TED ECC (e.g., "0E," "1E," "2E," and "3E") and LRAID ECC (e.g., "NE," "CE," and "UE) represents an error condition (e.g., "CORRECT", "CORRECTABLE", or "UNCORRECTABLE") For example, DEC-TED ECC of "0E" and LRAID ECC of "NE" produces an error condition of "CORRECT," DEC-TED ECC of "1E," or "2E" and LRAID ECC of "NE" produces an error condition of "CORRECTABLE," DEC-TED ECC of "0E," "1E," "2E," or "3E" and LRAID ECC of "CE" produces an error condition of "CORRECTABLE," DEC-TED ECC of "3E" and LRAID ECC of "NE" produces an error condition of "UNCORRECTABLE," and DEC-TED ECC of "0E," "1E," "2E," or "3E" and LRAID ECC of "UE" produces an error condition of "UNCORRECTABLE."

As a result of a read operation, the error management component 113 may query the error condition table 300 using the received ECCs (e.g., DEC-TED ECC and the LRAID ECC) to determine an error condition. The read operation may be initiated by a wear leveling operation or a host read request. Based on the determined error condition, the error management component 113 may update the L2P data structure, or generate a hole in the L2P data structure, as previously described.

Figure 4:
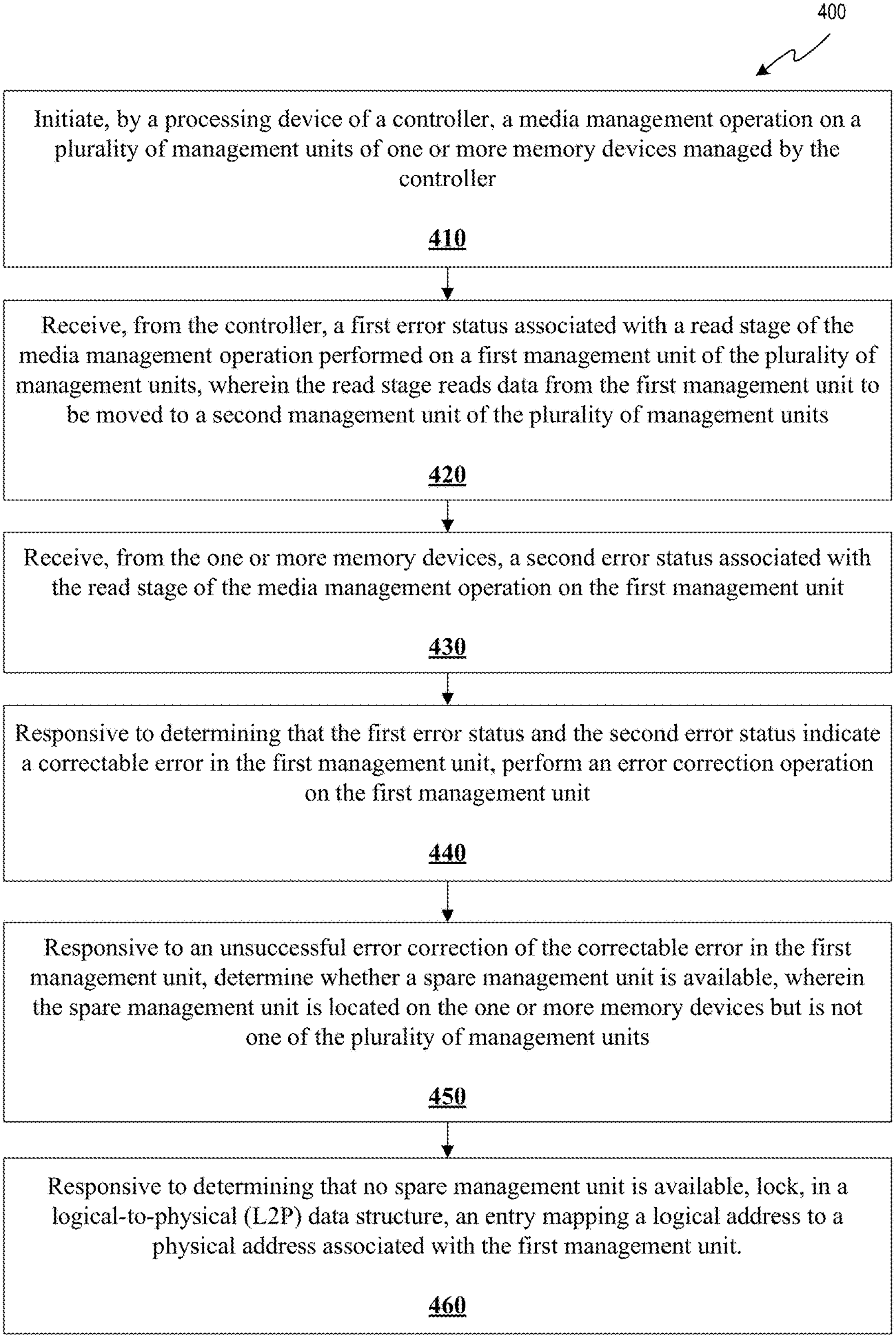
FIG. 4 is a flow diagram of an example method for error management of a CXL device in accordance with some embodiments of the present disclosure.

FIG. 4 is a flow diagram of an example method 400 to error management of a CXL device, in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the error management component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 410, the processing logic initiating, by a processing device of a controller, a media management operation on a plurality of management units of one or more memory devices managed by the controller. As previously described, the plurality of management units of one or more memory devices may be a wear leveling pool which includes an extra management unit (e.g., a gap management unit) that contains no useful data. Each management unit corresponds to a physical address. A logical-to-physical (L2P) data structure is used to maintain a mapping between logical addresses and physical addresses of the wear leveling pool.

As previously described, the media management operation may be a wear leveling operation. Performing the wear leveling operations includes performing a read operation (e.g., read stage). The read stage reads data from the first management unit to be moved to a second management unit of the plurality of management units. The first management unit refers to the management unit corresponding with the logical address which typically neighbors the second management unit. The second management unit refers to the gap management unit.

At operation 420, the processing logic receives, from the controller, a first error status associated with a read stage of the media management operation performed on a first management unit of the plurality of management units. At operation 430, the processing logic receives, from the one or more memory devices, a second error status associated with the read stage of the media management operation on the first management unit. As previously described, the one or more memory devices may include a Double Error Correcting, Triple Error Detecting (DEC-TED) scheme which refers to the ability of the error correction code to correct up to two errors within a data word and to detect up to three errors with the data word.

At operation 440, responsive to determining that the first error status and the second error status indicate a correctable error in the first management unit, the processing logic performs an error correction operation (e.g., memory scrubbing operation) on the first management unit. As previously described, the first and second error may be used to determine an error condition of the read data. The error condition may be no error, correctable error, and uncorrectable error.

At operation 450, responsive to an unsuccessful error correction of the correctable error in the first management unit, the processing logic determines whether a spare management unit is available. The spare management unit is located on the one or more memory devices but is not one of the plurality of management units. As previously described, the spare management unit is from a spare wear leveling pool that is distinct from the wear leveling pool.

At operation 460, responsive to determining that no spare management unit is available, the processing logic locks, in a logical-to-physical (L2P) data structure, an entry mapping a logical address to a physical address associated with the first management unit. Locking, in the L2P data structure, the entry mapping the logical address to the physical address associated with the first management unit includes causing the processing logic to generate, based on the first error status and the second error status, an event record which includes the logical address associated with the locked mapping entry and the physical address associated with the locked mapping entry.

Depending on the embodiment, responsive to determining that the spare management unit is available, the processing logic performs a write stage of the media management operation on the spare management unit. Performing the wear leveling operations includes performing a write operation (e.g., write stage). The write stage writes data read from the first management unit to the spare management unit. The processing logic proceeds to update an entry in the L2P data structure mapping the logical address to a physical address associated with the spare management unit.

Depending on the embodiment, responsive to a successful error correction of the correctable error in the first management unit, the processing logic performs a write stage of the media management operation on the second management unit of the plurality of management units. The write stage writes data read from the first management unit to the second management unit. The processing logic proceeds to update an entry in the L2P data structure mapping the logical address to a physical address associated with the second management unit.

Depending on the embodiment, responsive to determining that the first error status and the second error status indicate no error in the first management unit, the processing logic performs a write stage of the media management operation on the second management unit of the plurality of management units. The write stage writes data read from the first management unit to the second management unit. The processing logic proceeds to update an entry in the L2P data structure mapping the logical address to a physical address associated with the second management unit.

Depending on the embodiment, responsive to determining that the first error status and the second error status indicate an uncorrectable error in the first management unit, the processing logic locks, in the L2P data structure, an entry mapping a logical address to a physical address associated with the first management unit. The processing logic proceeds to logging, to a list, a logical address associated with the first management unit.

Depending on the embodiment, the processing logic logs, based on the first error status and the second error status associated with the first management unit, the physical address associated with the first management unit to an error log.

Figure 5:
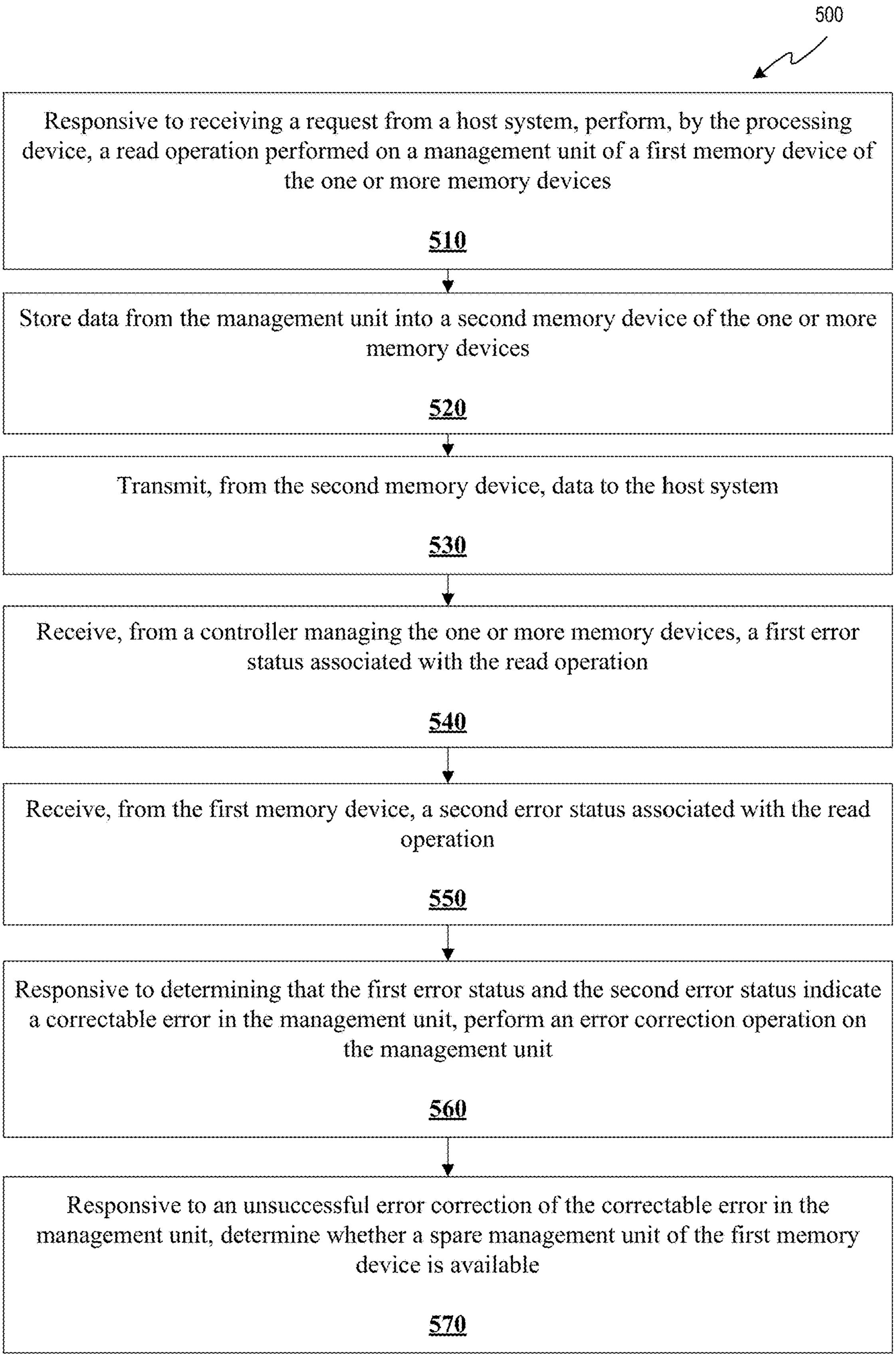
FIG. 5 is a flow diagram of an example method for error management of a CXL device in accordance with some embodiments of the present disclosure.

FIG. 5 is a flow diagram of an example method 500 to error management of a CXL device, in accordance with some embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the error management component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 510, responsive to receiving a request from a host system, the processing logic performs, by the processing device, a read operation performed on a management unit of a first memory device of the one or more memory devices. The first memory device is a non-volatile memory device. At operation 520, the processing logic stores data from the management unit into a second memory device of the one or more memory devices. The second memory device is a volatile memory device. At operation 530, the processing logic transmits, from the second memory device, data to the host system.

At operation 540, the processing logic receives, from a controller managing the one or more memory devices, a first error status associated with the read operation. At operation 550, the processing logic receives, from the first memory device, a second error status associated with the read operation. As previously described, the one or more memory devices may include a Double Error Correcting, Triple Error Detecting (DEC-TED) scheme which refers to the ability of the error correction code to correct up to two errors within a data word and to detect up to three errors with the data word.

At operation 560, responsive to determining that the first error status and the second error status indicate a correctable error in the management unit, the processing logic performs an error correction operation (e.g., memory scrubbing operation) on the management unit. As previously described, the first and second error may be used to determine an error condition of the read data. The error condition may be no error, correctable error, and uncorrectable error.

At operation 570, responsive to an unsuccessful error correction of the correctable error in the management unit, the processing logic determines whether a spare management unit of the first memory device is available. The spare management unit is located on the one or more memory devices but is not one of the plurality of management units. As previously described, the spare management unit is from a spare wear leveling pool that is distinct from the wear leveling pool.

At operation 580, responsive to determining that no spare management unit is available, the processing logic locks, in a logical-to-physical (L2P) data structure, an entry mapping a logical address to a physical address associated with the first management unit. Locking, in the L2P data structure, the entry mapping the logical address to the physical address associated with the first management unit includes causing the processing logic to generate, based on the first error status and the second error status, an event record which includes the logical address associated with the locked mapping entry and the physical address associated with the locked mapping entry.

Depending on the embodiment, responsive to determining that the spare management unit is available, the processing logic performs a write stage of the media management operation on the spare management unit. Performing the wear leveling operations includes performing a write operation (e.g., write stage). The write stage writes data read from the first management unit to the spare management unit. The processing logic proceeds to update an entry in the L2P data structure mapping the logical address to a physical address associated with the spare management unit.

Depending on the embodiment, responsive to determining that the first error status and the second error status indicate an uncorrectable error in the first management unit, the processing logic locks, in the L2P data structure, an entry mapping a logical address to a physical address associated with the first management unit. The processing logic proceeds to logging, to a list, a logical address associated with the first management unit.

Depending on the embodiment, the processing logic logs, based on the first error status and the second error status associated with the first management unit, the physical address associated with the first management unit to an error log.

Figure 6:
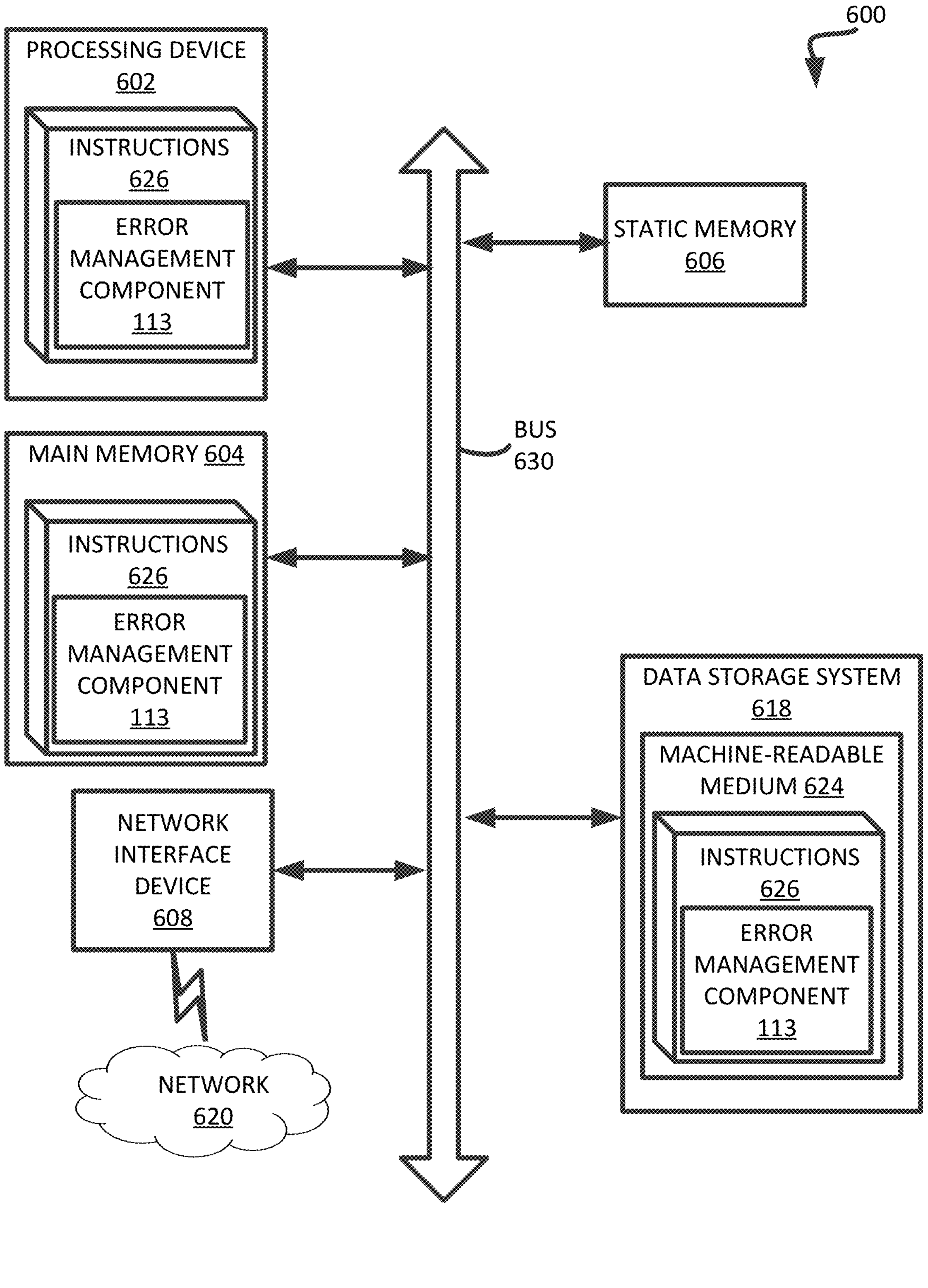
FIG. 6 is a block diagram of an example computer system in which embodiments of the present disclosure may operate.

FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the error management component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or RDRAM, etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to an error management component (e.g., the error management component 113 of FIG. 1). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:

initiating, by a processing device of a controller, a media management operation on a plurality of management units of one or more memory devices managed by the controller;

receiving, from the controller, a first error status associated with a read stage of the media management operation performed on a first management unit of the plurality of management units, wherein the read stage reads, from the first management unit, data to be moved to a second management unit of the plurality of management units;

receiving, from the one or more memory devices, a second error status associated with the read stage of the media management operation on the first management unit;

responsive to determining that the first error status and the second error status indicate a correctable error in the first management unit, performing an error correction operation on the first management unit;

responsive to an unsuccessful error correction of the correctable error in the first management unit, determining whether a spare management unit is available, wherein the spare management unit is located on the one or more memory devices but is not one of the plurality of management units; and responsive to determining that no spare management unit is available, locking, in a logical-to-physical (L2P) data structure, an entry mapping a logical address to a physical address associated with the first management unit.

2. The method of claim 1, further comprising:

responsive to determining that the spare management unit is available, performing a write stage of the media management operation on the spare management unit, wherein the write stage writes data read from the first management unit to the spare management unit; and updating, in the L2P data structure, an entry mapping the logical address to a physical address associated with the spare management unit.

3. The method of claim 1, further comprising:

responsive to a successful error correction of the correctable error in the first management unit, performing a write stage of the media management operation on the second management unit of the plurality of management units, wherein the write stage writes data read from the first management unit to the second management unit; and updating, in the L2P data structure, an entry mapping the logical address to a physical address associated with the second management unit.

4. The method of claim 1, further comprising:

responsive to determining that the first error status and the second error status indicate no error in the first management unit, performing a write stage of the media management operation on the second management unit of the plurality of management units, wherein the write stage writes data read from the first management unit to the second management unit; and updating, in the L2P data structure, an entry mapping the logical address to a physical address associated with the second management unit.

5. The method of claim 1, further comprising:

responsive to determining that the first error status and the second error status indicate an uncorrectable error in the first management unit, locking, in the L2P data structure, an entry mapping a logical address to a physical address associated with the first management unit.

6. The method of claim 5, wherein determining that the first error status and the second error status indicate an uncorrectable error in the first management unit comprises:

logging, to a list, a logical address associated with the first management unit.

7. The method of claim 1, further comprising:

logging, based on the first error status and the second error status associated with the first management unit, the physical address associated with the first management unit to an error log.

8. The method of claim 1, wherein locking, in the L2P data structure, the entry mapping the logical address to the physical address associated with the first management unit comprises:

generating, based on the first error status and the second error status, an event record, wherein the event record includes the logical address associated with the locked mapping entry and the physical address associated with the locked mapping entry.

9. The method of claim 1, wherein the error correction operation is a memory scrubbing operation.

10. A system comprising:

one or more memory devices; and a processing device coupled to the one or more memory devices, the processing device to perform operations comprising:

responsive to receiving a request from a host system, performing, by the processing device, a read operation performed on a management unit of the one or more memory devices;

storing data from the management unit into a second memory device of the one or more memory devices;

transmitting, from the second memory device, data to the host system;

receiving, from a controller managing the one or more memory devices, a first error status associated with the read operation;

receiving, from the first memory device, a second error status associated with the read operation;

responsive to determining that the first error status and the second error status indicate a correctable error in the management unit, performing an error correction operation on the management unit;

responsive to an unsuccessful error correction of the correctable error in the management unit, determining whether a spare management unit of the first memory device is available; and responsive to determining that no spare management unit is available, locking, in a logical-to-physical (L2P) data structure, an entry mapping a logical address to a physical address associated with the management unit.

11. The system of claim 10, wherein the processing device is to perform operations further comprising:

responsive to determining that a spare management unit is available, performing a write operation on the spare management unit, wherein the write operation writes data read from the management unit to the spare management unit; and updating, in the L2P data structure, an entry mapping the logical address to a physical address associated with the spare management unit.

12. The system of claim 10, wherein the processing device is to perform operations further comprising:

responsive to determining that the first error status and the second error status indicate an uncorrectable error in the management unit, locking, in the L2P data structure, an entry mapping the logical address to the physical address associated with the management unit.

13. The system of claim 12, wherein determining that the first error status and the second error status indicate an uncorrectable error in the management unit comprises:

logging, to a list, a logical address associated with the management unit.

14. The system of claim 10, wherein the processing device is to perform operations further comprising:

logging, based on the first error status and the second error status associated with the management unit, the physical address associated with the management unit to an error log.

15. The system of claim 10, wherein locking, in the L2P data structure, the entry mapping the logical address to the physical address associated with the management unit comprises:

generating, based on the first error status and the second error status, an event record, wherein the event record includes the logical address associated with the locked mapping entry and the physical address associated with the locked mapping entry.

16. The system of claim 10, wherein the error correction operation is a memory scrubbing operation.

17. A non-transitory computer-readable storage medium comprising instructions that, when executed by a processing device, cause the processing device to perform operations comprising:

initiating, by a processing device of a controller, a media management operation on a plurality of management units of one or more memory devices managed by the controller;

receiving, from the controller, a first error status associated with a read stage of the media management operation performed on a first management unit of the plurality of management units, wherein the read stage reads, from the first management unit, data to be moved to a second management unit of the plurality of management units;

receiving, from the one or more memory devices, a second error status associated with the read stage of the media management operation on the first management unit;

responsive to determining that the first error status and the second error status indicate a correctable error in the first management unit, performing an error correction operation on the first management unit;

responsive to an unsuccessful error correction of the correctable error in the first management unit, determining whether a spare management unit is available, wherein the spare management unit is located on the one or more memory devices but is not one of the plurality of management units; and responsive to determining that no spare management unit is available, locking, in a logical-to-physical (L2P) data structure, an entry mapping a logical address to a physical address associated with the first management unit.

18. The non-transitory computer-readable storage medium according to claim 17, further comprising:

responsive to determining that the spare management unit is available, performing a write stage of the media management operation on the spare management unit, wherein the write stage writes data read from the first management unit to the spare management unit; and updating, in the L2P data structure, an entry mapping the logical address to a physical address associated with the spare management unit.

19. The non-transitory computer-readable storage medium according to claim 17, further comprising:

responsive to a successful error correction of the correctable error in the first management unit, performing a write stage of the media management operation on the second management unit of the plurality of management units, wherein the write stage writes data read from the first management unit to the second management unit; and updating, in the L2P data structure, an entry mapping the logical address to a physical address associated with the second management unit.

20. The non-transitory computer-readable storage medium according to claim 17, further comprising:

responsive to determining that the first error status and the second error status indicate no error in the first management unit, performing a write operation of the media management operation on the second management unit of the plurality of management units, wherein the write operation writes data read from the first management unit to the second management unit; and updating, in the L2P data structure, an entry mapping the logical address to a physical address associated with the second management unit.

* * * * *